United States Patent [19]

Suzuki et al.

[11] Patent Number: 5,019,257
[45] Date of Patent: May 28, 1991

[54] PARALLEL FILTERING CIRCUIT WITH CONDUITS OF DIFFERENT RATES

[75] Inventors: Tadashi Suzuki, Machida; Yoneji Wada, Urawa, both of Japan

[73] Assignee: Takano Corporation, Japan

[21] Appl. No.: 494,815

[22] Filed: Mar. 15, 1990

Related U.S. Application Data

[63] Continuation of Ser. No. 311,368, Feb. 13, 1989, abandoned, which is a continuation of Ser. No. 114,207, Oct. 28, 1987, abandoned.

[30] Foreign Application Priority Data

Jun. 19, 1987 [JP] Japan .................. 62-151367

[51] Int. Cl.⁵ .......................... B01D 36/00
[52] U.S. Cl. .................... 210/253; 210/314; 55/324; 55/484; 123/196 A
[58] Field of Search .............. 210/134, 253, 314, 340, 210/341, 422, 423; 55/484, 133, 324, 483; 123/196 R, 196 A

[56] References Cited

U.S. PATENT DOCUMENTS

| | | | |
|---|---|---|---|
| 2,565,106 | 8/1951 | Wasterind et al. | 55/133 |
| 2,729,338 | 1/1956 | Heigl | 210/341 |
| 2,979,160 | 4/1961 | Haas | 210/340 |
| 3,715,416 | 2/1973 | Campbell et al. | 210/340 |
| 3,770,623 | 11/1973 | Seidel | 210/253 |
| 3,868,322 | 2/1975 | Orlaff | 210/340 |
| 3,935,108 | 1/1976 | Forgues | 210/340 |
| 3,988,127 | 10/1976 | Schumann | 55/133 |
| 4,478,714 | 10/1984 | Blake et al. | 210/340 |
| 4,655,914 | 4/1987 | Wada | 210/168 |

Primary Examiner—Robert A. Dawson
Assistant Examiner—Wanda L. Millard
Attorney, Agent, or Firm—Jordan B. Bierman

[57] ABSTRACT

Disclosed is a parallel filtering circuit comprising at least two filters of a depth layer filtering type connected in parallel to each other in conduits showing different fluid resistances respectively, whereby, even when both the filters are clogged with particles of contaminants, the total flow rate may not decrease sharply, so that a preventive measure can be immediately taken before a fatal situation occurs. An orifice may be connected at its inlet to the outlet of the conduit having a smaller fluid resistance and at its outlet to the outlet of the conduit having a having fluid resistance.

5 Claims, 4 Drawing Sheets

F I G. 1
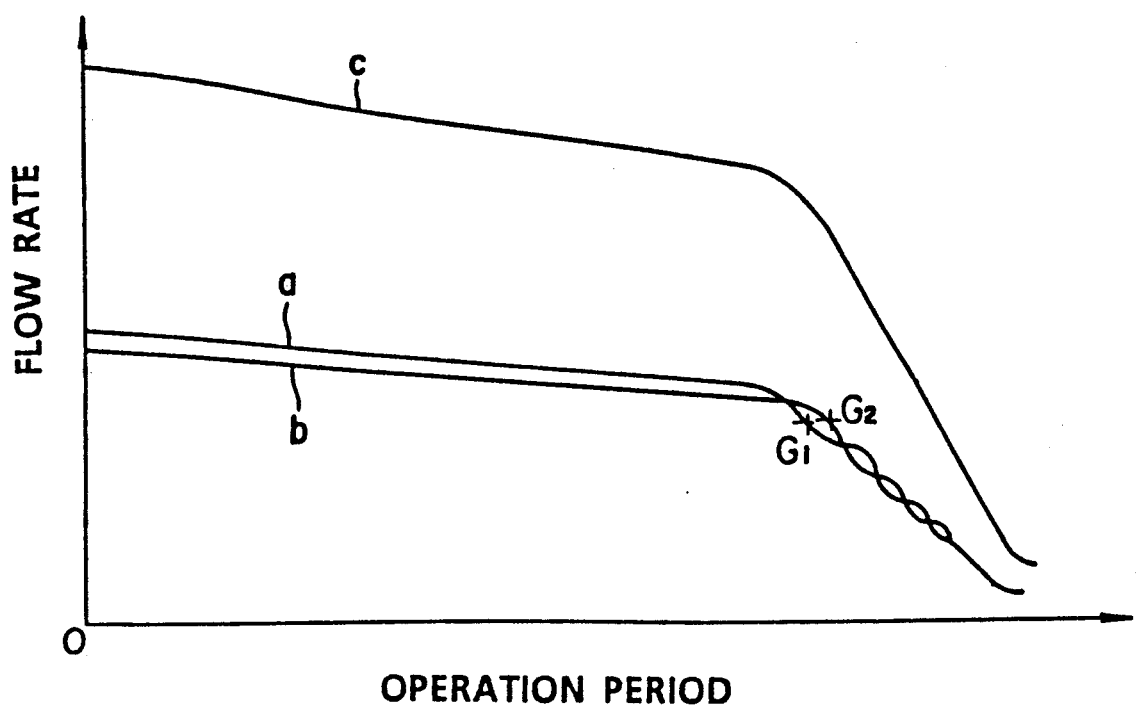
F I G. 2
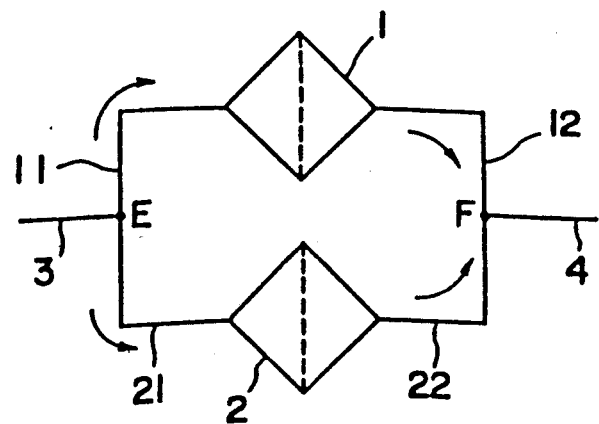

PARALLEL FILTERING CIRCUIT WITH CONDUITS OF DIFFERENT RATES

This Application is a Continuation of application Ser. No. 311,368, filed Feb. 13, 1989 and now abandoned; which is a Continuation of application Ser. No. 114,207, filed Oct. 28, 1987 and now abandoned; which claims the priority of Japanese No. 151367/87, filed Jun. 19, 1987.

BACKGROUND OF THE INVENTION

1. Field of the Invention

This invention relates to a parallel filtering circuit used for parallel filtration of a fluid.

2. Description of the Prior Art

With the recent remarkable development in various industrial fields, it is increasingly strongly demanded to supply fluids of highest possible purity as various kinds of industrial raw materials or to use such pure fluids in various industrial manufacturing processes. Also, a fluid filtering circuit used for filtration of such a fluid is required to be capable of removing contaminants with a highest possible reliability and to be capable of maintaining the contaminant removing capability for a long period of time. To meet the above demands, various kinds of filters of the so-called depth layer type have been developed and put into practical use. This filter of the so-called depth layer type arrests contaminants of large and small particle sizes in its different filtering layers according to the particle sizes of the contaminants contained in a fluid. Thus, the filter of the depth layer filtering type has such a very excellent capability of contaminant removal that it can arrest a large amount of contaminants contained in a fluid over a relatively long useful service life.

The filter of the depth layer type has, for example, a structure as shown in FIGS. 7 and 8. FIG. 7 is a top plan view of the filter of the depth layer type, and FIG. 8 is a partly sectional, front elevation view of the filter of the depth layer type. As shown in FIGS. 7 and 8, the filter of the depth layer type is comprised of a bobbin 31 provided with flanges on both ends respectively of a hollow cylindrical member formed with many small perforations 31a and defining a fluid passage therein-side, and wires 32 wound around the bobbin 31 with such a winding density distribution that the winding desity progressively increases from the outermost wire layer toward the innermost wire layer. When a fluid containing contaminants flows past the outermost layer and toward the innermost layer of the wires 32 as shown by the arrows in FIG. 8, larger contaminant particles are arrested by the outer wire layers, while smaller contaminant particles are arrested by the inner wire layers. Thus, the fluid is progressively purified by the successive wire layers, and the purified fluid finally flows out through the perforations 31a into the fluid passage difined in the cylindrical member of the bobbin 31. However, the filter of the depth layer filtering type has been defective in that, once the flow of a fluid through the filter is obstructed or blocked due to local clogging of the filtering layers by contaminants particles, the rate of flow of the fluid through the filter decrease sharply, and a fatal situation may occur depending on the service. Therefore, it has been necessary to pay careful attention to its practical application. The relation between the flow rate of a fluid flowing through a filter of the depth layer filtering type and the period of time of operation of the filter for removal of contaminants is as, for example, shown by a characteristic curve in FIG. 6. It will be seen in FIG. 6 that the flow rate of the fluid flowing though the filter decreases progressively, although slightly, from the time immediately after the filter starts its operation. Such a progressive decrease in the fluid flow rate results from the fact that particles of contaminants contained in the fluid and arrested by the filter progressively accumulate inside the filter to cause local clogging of the internal layers of the filter. This local clogging spreads progressively with time until a flow blocking point G is reached where the internal layers of the filter are substantially entirely clogged with the contaminant particles. After this flow blocking point G is reached, the fluid flows through slight gaps remaining in the internal layers of the filter or flows between the accumulating contaminant particles while breaking through the contaminant particles. As a result, the contaminant particles further accumulate to sharply decrease the flow rate of the fluid flowing through the filter.

Therefore, a serious trouble may occur when the above filter is used for filtration of, for example, lubricating oil lubricating bearing for a shaft. The trouble is that the bearings had already burnt and stuck to the shaft due to shortage of supplied lubricating oil when the operator, who found a sharp decrease in the flow rate of the lubricating oil after the flow blocking point G was reached, judged that the filter had to be replaced.

SUMMARY OF THE INVENTION

It is a primary object of the present invention to provide a parallel filtering circuit in which the excellent contaminant removing capability of a filter of the depth layer filtering type is fully exhibited, and the flow rate of a fluid flowing through the filter, after the flow blocking point is reached, is controlled to decrease more gradually that in the prior art circuit, so that a suitable preventive measure can be taken before a fatal situation occurs.

In accordance with the present invention which attains the above object, there is provided a parallel filtering circuit comprising a plurality of filters connected in parallel to each other in a plurality of conduits connected between an inlet conduit and an outlet conduit and showing different fluid resistance respectively.

The flow rate of a fluid flowing through a first filter connected in a conduit showing a smaller fluid resistance is larger than the of a second filter connected in another conduit showing a larger fluid resistance. Therefore, the first filter arrests and accumulate particles of contaminants more quickly than the second filter and reaches a flow blocking state earlier than the second filter. On the other hand, the flow rate of the fluid flowing through the second filter connected in the conduit showing the larger fluid resistance is smaller than that of the first filter. Therefore, the second filter reaches its flow blocking state at time correspondingly later than that of the first filter. That is, there is a difference between the times at which the first and second filters reach their flow blocking states respectively.

BRIEF DESCRIPTION OF THE DRAWINGS

FIG. 1 is a graph showing the operation period vs. flow rate characteristic of a first embodiment of the parallel filtering circit of the present invention. FIG. 2 shows diagrammatically the structure of the first embodiment of the present invention.

DESCRIPTION OF THE PREFERRED EMBODIMENTS

Figure 3:
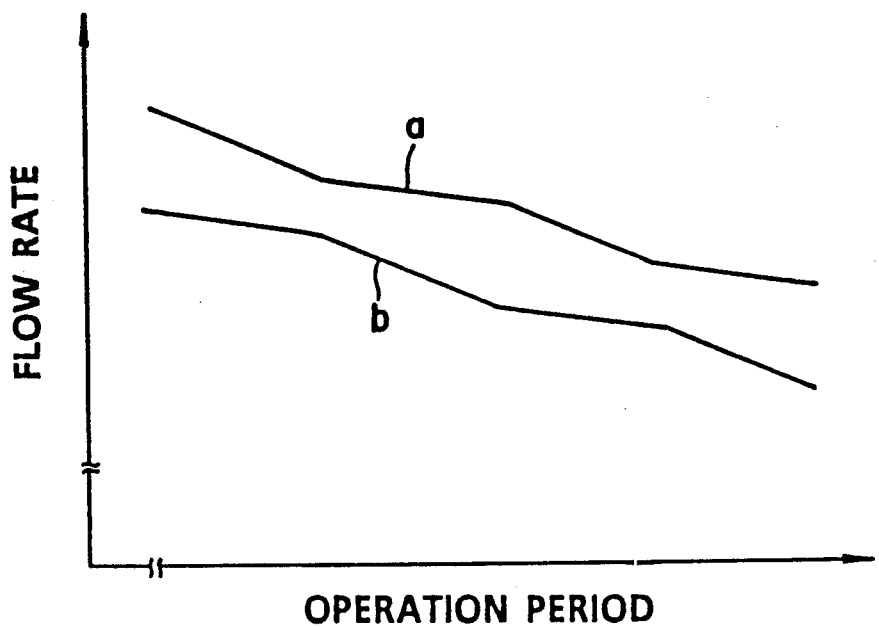
FIG. 3 is an enlarged view of part of the graph shown in FIG. 1

Referred embodiments of the present invention will now be described in detail.

FIG. 2 shows a first embodiment of the parallel filtering circuit according to the present invention. Referring to FIG. 2, a first filter 1 and a second filter 2, both of which are of the depth layer filtering type, are connected in parallel to each other by first conduits 11, 12 and second counduits 21, 22, respectively. The first and second filters 1 and 2 have the same size hence, the same capacity. The conduits 11 and 21 are connected at their inlets to a common inlet conduit 3, and the conduits 12 and 22 are connected at their outlets to a common outlet conduit 4. Because of the connection arrangement described above, a fluid supplied by way of the inlet conduit 3 is divided into two portions at the connection point E, and the divided fluid portions flow through the conduits 11 and 21. The fluid portions flow then through the filters 1, 2 and conduits 12, 22 respectively to join each other at the connection point F, and the joined flow flows finally into the outlet conduit 4. The inner diameter of the first conduits 11 and 12 is selected to be larger than that of the second conduits 21 and 22. Therefore, the fluid resistance of the first conduits 11 and 12 is smaller than that of the second conduits 21 and 22.

The parallel filtering circuit having the structure described above was used in a test in which a fluid containing contaminants was supplied from the inlet conduit 3 toward the outlet conduit 4. FIG. 1 shows the test results. In FIG. 1, the flow rates a, b and c of the fluid flowing through the first filter 1, the second filter 2, and the inlet conduit 3 or outlet conduit 4 respectively are measured to determine the operation period vs. flow rate charcteristic of the parallel filtering circuit. Therefore, there is the relation $C=a+b$.

It will be seen in FIG. 1 that the flow rate a is slightly larger than the flow rate b when the circuit operates in a steady state from the starting time of filtering operation to times where the flow blocking points $G_1$ and $G_2$ are reached. This is because the fluid resistance of the first conduits 11 and 12 is smaller that that of the second conduits 21 and 22. In the steady operation state of the circuit, the flow rates a and b progressively slightly decrease with time while maintaining a substantially constant ratio therebetween, and such a change in the flow rates a and b observed in FIG. 1 seems to be similar to that shown in FIG. 6. Actually, however, the flow rates a and b progressively slightly decrease while repeating a change in a serrating fashion as shown in FIG. 3 which is an enlarged view of part of FIG. 1. Since the flow rate a of the fluid flowing through the filter 1 is larger than the flow rate b of the fluid flowing through the filter 2, the contaminant particles are arrested by and accumulated in the filter 1 at a rate greatly than that in the filter 2, and the fluid resistance of the filter 1 shows a proportional increase. As a result, the flow rate a of the fluid flowing through the filter 1 tends to decrease, while that b of the fluid flowing through the filter 2 tends to increase. After a short time, the flow rate b of the fluid flowing through the filter 2 increases, and the rate of arresting and accumulating the contaminant particles in the filter 2 becomes greater than that in the filter 1. Therefore, the relation is now reversed, and the flow rate b of the fluid flowing through the filter 2 tends to decrease, while that a of the fluid flowing through the filter 1 tends to increase. By repetition of such a tendency, the flow rates a and b change in a serrating fashion as shown in FIG. 3. In the first filter 1 through which the fluid of a larger amount flows than that in the second filter 2, the rate of accumulation of arrested contaminant particles therein is higher than that of the second filter 2. Accordingly, the flow blocking point $G_1$ for the fluid flow through the first filter 1 is reached earlier, and, with a certain delay time, the flow blocking point $G_2$ for the fluid flow through the second filter 2 is reached. After the flow blocking point $G_1$ and $G_2$ are reached, the flow rates a and b sharply decrease, and the serrating change in the flow rates a and b becomes greater to such an extent that the curves representing the flow rates a and b repeatedly cross each other. As a result, the rate of decrement of the total flow rate c which is the sum of the flow rates a and b increases after the flow blocking point $G_1$ for the fluid flow through the first filter 1 is reached. However, the rate of decrement of the total flow rate in the present invention is only about the half of the observed after the flow blocking point G is reached on the prior art characteristic curve shown in FIG. 6, and an undesirable sharp decrease in the fluid flow rate can be prevented.

Thus, when the operator who finds a large rate of fluid flow decrement takes immediately a necessary preventive measure such as replacement of the filters 1 and 2. A fatal situation attributable to shortage of the fluid flow rate can be avoided.

Figure 5:
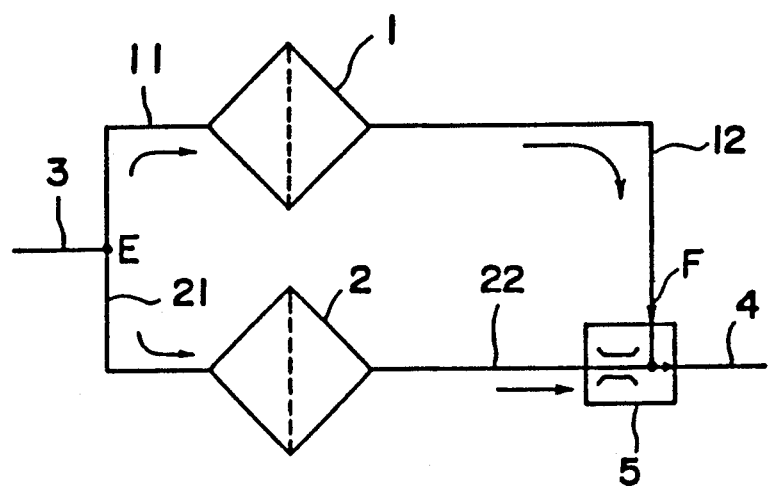
FIG. 5 shows diagrammatically the structure of the second embodiment of the present invention.

A second embodiment of the present invention will be described with reference to FIG. 5. This second embodiment is a modification of the first embodiment in that an orifice 5 is added to the first embodiment shown in FIG. 2. That is, an orifice 5 is interposed between the conduit 22 and the outlet conduit 4, and the conduit 12 is connected to a point immediately downstream of the outlet of the orifice 5.

Figure 4:
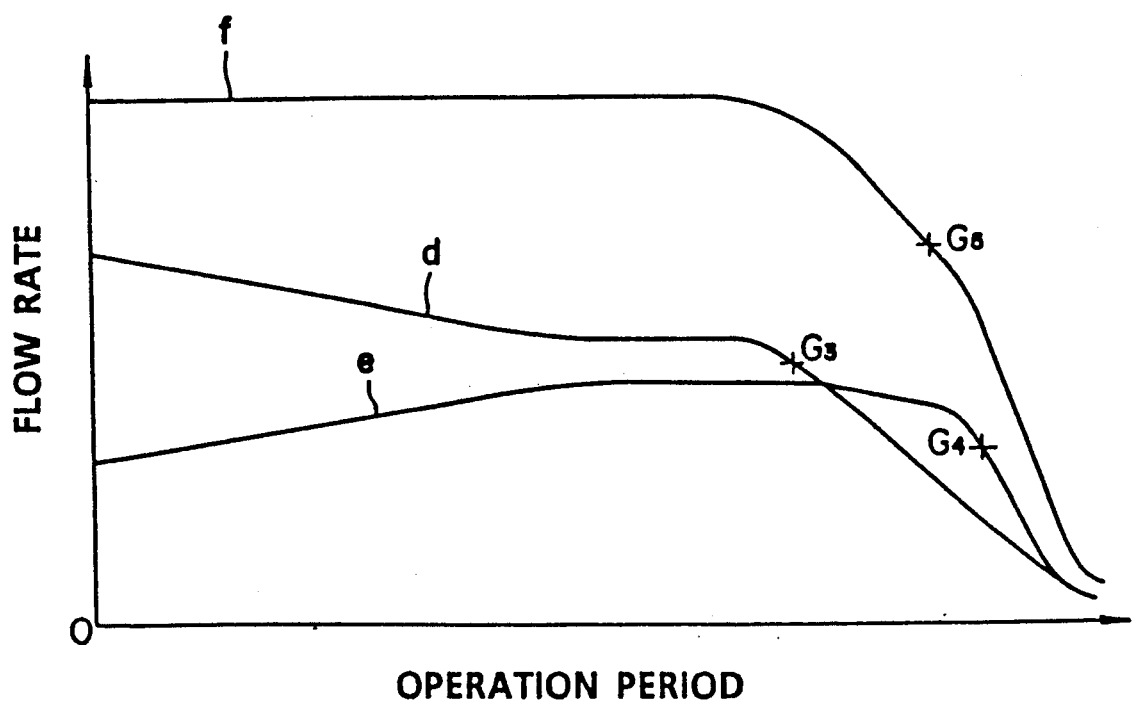
FIG. 4 is a graph showing the opertion period vs. flow rate characteristic of a second embodiment of the present invention.

In the parallel filtering circuit having such a structure, a fluid containing contaminants was supplied from the inlet conduit 3 toward the outlet conduit 4, and the results shown in FIG. 4 were obtained. In FIG. 4, the flow rates d, e, and f of the fluid flowing through the first filter 1, the second filter 2, and the inlet conduit 3 or outlet conduit 4 respectively are measured to determine the operation period vs. flow rate characteristic of the parallel filtering circuit. Therefore, there is the relation $f=d+e$.

It will be seen in FIG. 4 that the flow rate d is greatly larger than the flow rate e immediately after the filtration starting time and occupies a greater proportion of the total flow rate f. This is because the sum of the fluid resistances of the conduit 11, filter 1 and conduit 12 is much smaller than the sum of those of the conduit 21, filter 2 conduit 22 and orifice 5. Thereafter, the flow rate d progressively slightly decrease with time, while the flow rate e progressively slightly increases with time, and the total flow rate f which is the sum of the flow rates d and e is maintained at substantially constant value. Then, after the flow rates d and e are both maintained at substantially constant values, the flow rate d starts to gradually decrease, while the flow rate e starts to progressively slightly decrease. In the meantime, a negative pressure corresponding to the flow rate of the fluid flowing through the orifice 5, that is, a negative pressure corresponding to the flow rate e appears at the open outlet of the orifice 5. This negative pressure is applied to the outlet of the conduit 12 and acts to forcedly draw out the fluid flowing through the conduit 12, thereby tending to increase the flow rate d. Therefore, the flow rate d is maintained at a substantially constant value for a certain period of time. Thereafter, the flow rate d gradually decreases until a flow blocking point $G_3$ is reached, and after the point $G_3$, it continues to gradually decrease. The flow rate e of the fluid flowing through the conduit 21, filter 2 and conduit 22 is limited by the orifice 5, and the flow rate e is maintained at a substantially constant value for a certain period of time as in the case of the flow rate d. Thereafter, with the increase in the amount of the contaminant particles removed from and accumulating in the filter 2, the flow rate e starts to gradually decrease, and a flow blocking point $G_4$ is reached at time greatly delayed relative to that $G_3$ for the flow rate d. After the point $G_4$, the flow rate e decreases relatively sharply.

As a consequence, the total flow rate f which is the sum of the flow rates d and e is maintained at a substantially constant value until the flow blocking point $G_3$ is reached on the curve representing the flow rate d, and gradually decreases thereafter. At the time corresponding to the flow blocking point $G_4$ on the curve representing the flow rate e, the total flow rate f decreases at an increased rate of decrement.

Figure 6:
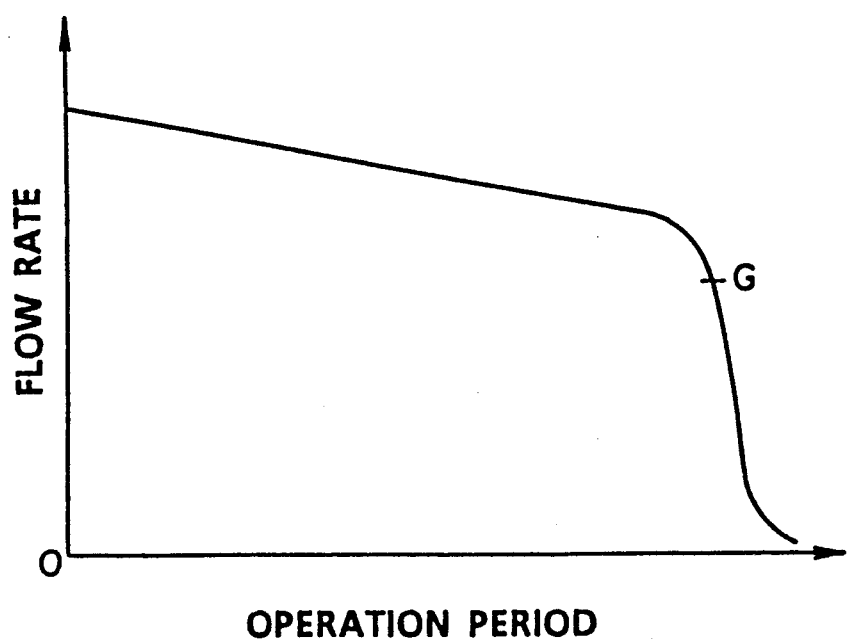
FIG. 6 is a graph showing the operation period vs. flow rate characteristic of a prior art filtering circuit.
Figure 7:
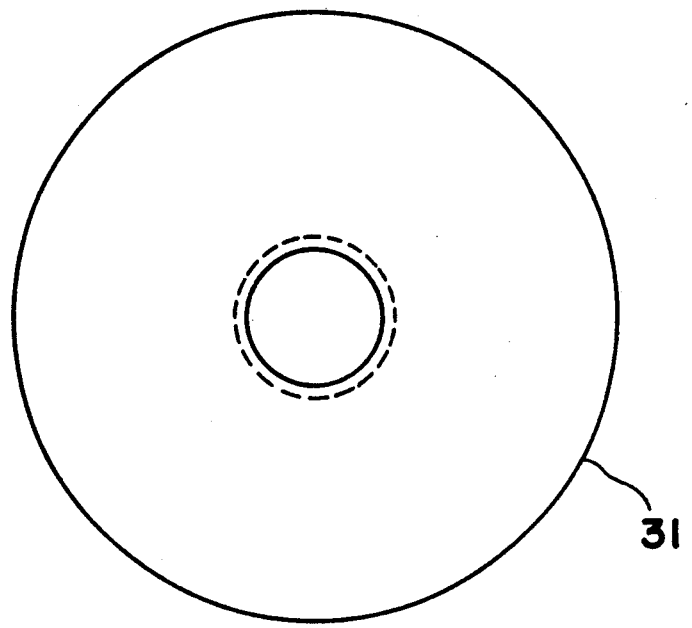
FIG. 7 is a top plan view of the filter of the depth layer type.
Figure 8:
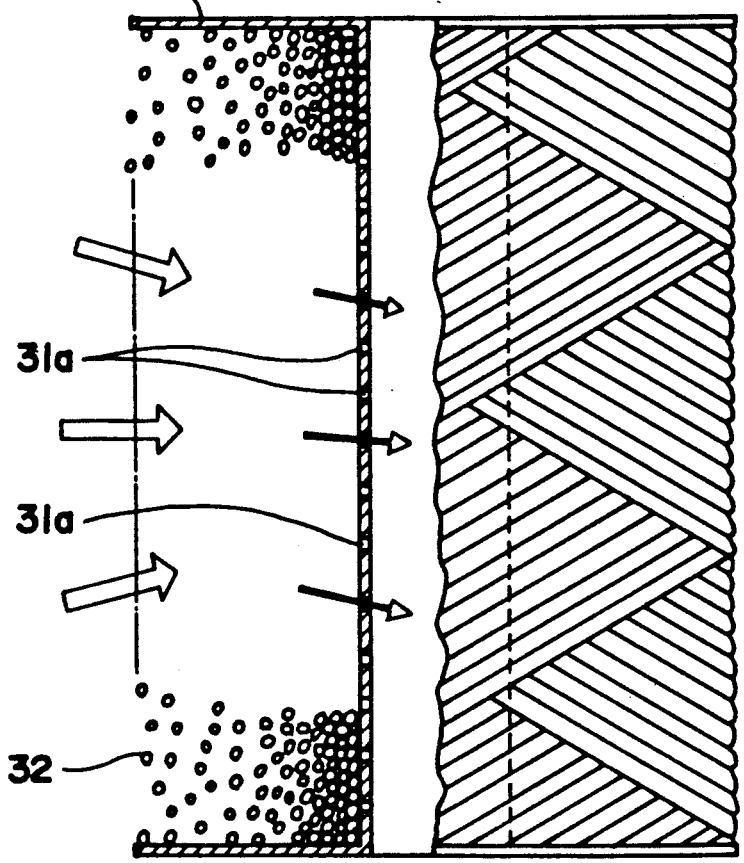
FIG. 8 is a partly sectional, front elevation view of the filter of the depth layer type.

Thus, the second embodiment of the parallel filtering circuit is advantageous over the prior art filtering circuit comprising only one filter as represented by the characteristic curve shown in FIG. 6 in that not only the total flow rate can be maintained substantially constant for a long period of time of filtering operation, but also the total flow rate changes more gradually even after a flow blocking point $G_5$ is reached where both the filters 1 and 2 are regarded to be clogged by particles of contaminants contained in a fluid. Therefore, the operator who finds such a flow rate change observed after the flow blocking point can immediately take a necessary preventive measure before a fatal situation takes place. Thus, occurrence of a fatal accident can be avoided.

In the aforementioned embodiments of the present invention, the inner diameter of the second conduits 21, 22 is selected to differ from that of the first conduits 11, 12 so that the fluid resistance of the conduits 21, 22 differs from that of the conduits 11, 12. However, means for providing different fluid resistances is in no way limited to the selection of different inner diameters. Further, the number of filters is in no way limited to two.

It will be understood from the foregoing detailed description of a few embodiments of the present invention that a fluid can flow through the circuit in a state in which its flow rate is gradually changing even after a flow blocking point reached where both the filters are regarded to be clogged by particles of contaminants contained in the fluid. Therefore, the operator who finds such a flow rate range observed after the flow blocking point can immediately take a necessary preventive measure, so that occurrence of a fatal situation can be avoided.

We claim

1. A parallel filter circuit for delivery of filtered fluid to an element, said circuit comprising a plurality of filters fluidly connected in parallel with each other in a plurality of conduits, said conduits being connected between a common inlet and a separate common outlet to provide parallel flow without substantial interruption, at least two of said plurality of conduits having different rates of fluid flow therethrough, said common outlet located downstream of said filters and upstream of said element, wherein said circuit consists essentially of said plurality of conduits having different resistance to fluid flow.

2. A parallel filter circuit for delivery of filtered fluid to an element, said circuit comprising a plurality of filters fluidly connected in parallel with each other in a plurality of conduits, said conduits being connected between a common inlet and a separate common outlet to provide parallel flow without substantial interruption, at least two of said plurality of conduits having different rates of fluid flow therethrough, said common outlet located downstream of said filters and upstream of said element, wherein said different rates of flow result from differences in sizes and/or fittings of said plurality of said conduits.

3. A parallel filter circuit for delivery of filtered fluid to an element, said circuit comprising a plurality of filters fluidly connected in parallel with each other in a plurality of conduits, said conduits being connected between a common inlet and a separate common outlet to provide parallel fluid flow during a normal filtering operation, at least two of said plurality of conduits having different rates of fluid flow therethrough, said common outlet located downstream of said filters and upstream of said element, wherein said circuit consists essentially of said plurality of conduits having different resistances to fluid flow.

4. A parallel filter circuit for delivery of filtered fluid to an element, said circuit comprising a plurality of filters fluidly connected in a parallel with each other in a plurality of conduits, said conduits being connected between a common inlet and a separate common outlet to provide parallel fluid flow during a normal filtering operation, at least two of said plurality of conduits having different rates of fluid flow therethrough, said common outlet located downstream of said filters and upstream of said element, wherein said different rates of flow result from difference in sizes and/or fittings of said plurality of said conduits.

5. A parallel filter circuit for delivery of filtered fluid to an element, said circuit comprising a plurality of filters fluidly connected in parallel with each other in a plurality of conduits, said conduits being connected between a common inlet and a separate common outlet to provide parallel flow without substantial interruption, at least two of said plurality of conduits, having different rates of fluid flow therethrough, said common outlet located between said filters and said element, said plurality of conduits comprising a first conduit having a greater resistance to fluid flow and a second conduit having a lesser resistance to fluid flow, an orifice in said first conduit at or adjacent said common outlet, an outlet end of said second conduit adjacent said orifice and downstream thereof, whereby flow of said filter fluid through said orifice reduces pressure in said second conduit, wherein said different rates of flow result from differences in sizes and/or fittings of said plurality of said conduits.

* * * * *